Aug. 16, 1927.
C. HOFLAND
1,639,609
COUPLING
Filed Aug. 27, 1926
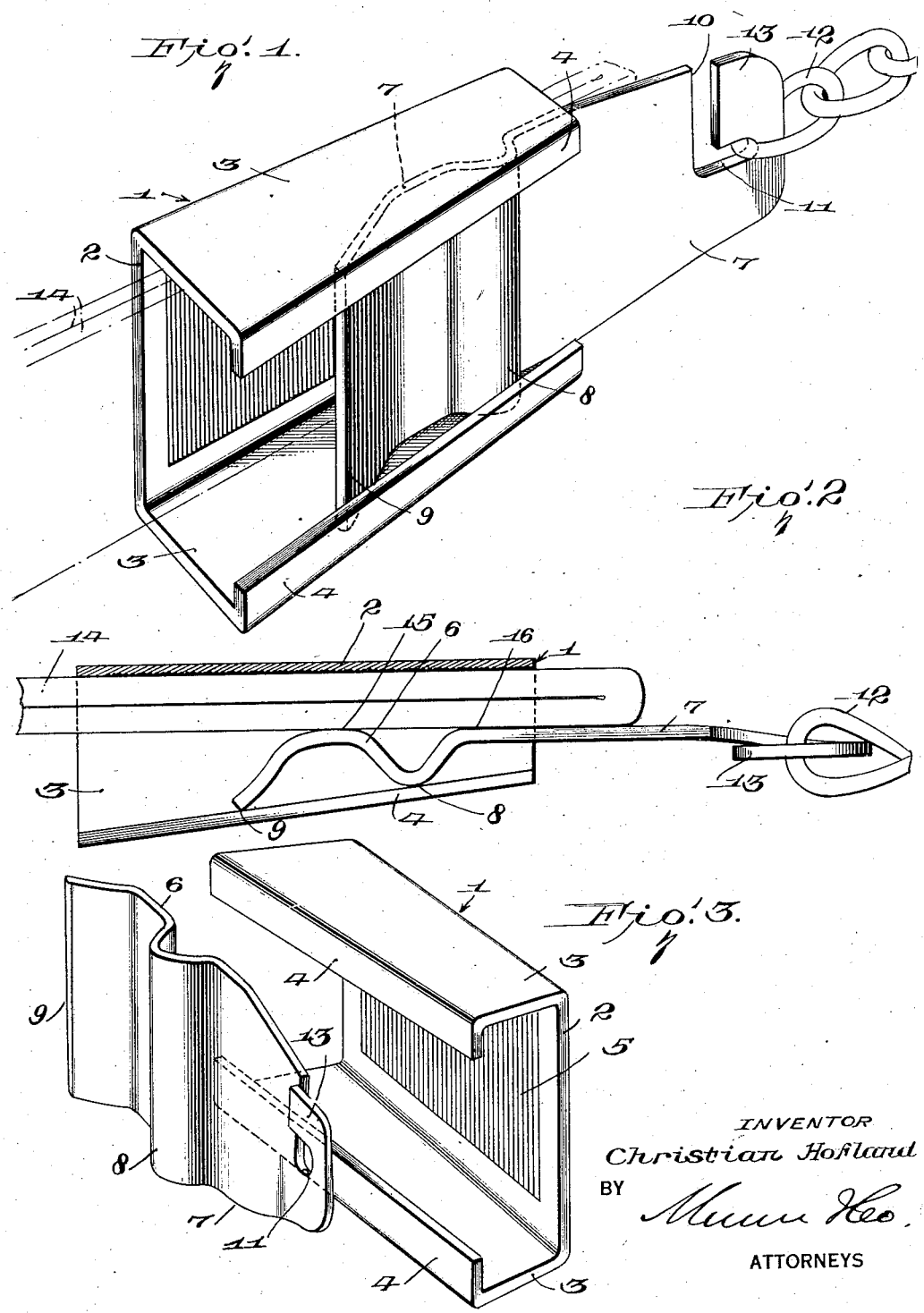
INVENTOR
Christian Hofland
BY
ATTORNEYS Patented Aug. 16, 1927.

1,639,609

UNITED STATES PATENT OFFICE.

CHRISTIAN HOFLAND, OF NEWBURG, NORTH DAKOTA.

COUPLING.

Application filed August 27, 1926. Serial No. 131,953.

My invention relates to improvements in couplings, and it consists in the combinations, constructions and arrangements herein described and claimed.

An object of the invention is the provision of a coupling of simple construction which comprises parts relatively adjustable with respect to one another to connect a strap or like member with a chain or the like or to release the strap or like member, as desired.

A further object of the invention is the provision of a coupling of the character described which will be actuated to more positively engage with one of two connected members when such connected members are pulled in opposite directions or a pull is exerted on one of such two connected members.

A further object of the invention is the provision of a coupling of the character described which is particularly well adapted for use as a connector between separate members of a draft appliance for a vehicle, as disclosed in my prior co-pending application for patent for hitch for draft animals, Serial Number 97,048, filed March 24, 1926.

Other objects and advantages of the invention will be apparent from the following description, considered in conjunction with the accompanying drawings, in which Figure 1 is a perspective view of a coupling embodying the invention, Figure 2 is a longitudinal section through the coupling, Figure 3 is a perspective group view of the elements of the coupling separated from one another.

The improved coupling comprises a body generally indicated at 1, which is substantially U-shaped in cross sectional configuration and comprises a substantially flat bottom 2 and a pair of parallel side members 3 having their longitudinal edge portions turned laterally inward to produce the cam lips 4. The side members 3 decrease in width regularly from one end of the body to the opposite end of the body so that the cam lips 4 lie in a plane which is inclined with respect to the plane of the bottom 2 of the body 1. The bottom 2 may have transverse teeth 5 formed in its inner face.

The body 1 may be formed of a light gauge metal or other suitable material.

The coupling also comprises a clamping member which is made of a strip of light gauge metal or other material and which comprises a main portion 6, which is uniform in width and is adapted to fit slidably between the side members 3 of the body 1. The clamping member also comprises an attaching end portion 7 which is an integral prolongation of the main porton 6 of the clamping member and which decreases in width from its juncture with the main portion 6 toward its outer end. The main portion of the clamping member is bent transversely adjacent to its juncture with the attaching end portion 7 to produce the transversely extending channel-shaped contact portion or corrugation 8 and the free end portion of the main part of the clamping member also is bent along a line which extends transversely of the clamping member until the end edge of said free end portion of the main body of the clamping member is substantially flush with the crest of the corrugation 8 and constitutes a contact edge which is indicated at 9 in the drawings.

The attaching end portion 7 of the clamping member is provided adjacent to its extremity with a lateral slit 10 which is turned outwardly and enlarged at its inner end at 11 for the reception of a portion of a link of a chain 12 or other suitable loop or eye member, the portion of the attaching part of the clamping member at the outer side of the slit 10 being bent flatwise to produce the hook 13 with which a link of the chain 12 can be conveniently engaged and which will tend to prevent accidental displacement of the link of said chain from position in the seat 11.

From the foregoing description of the various parts of the device, the operation thereof may be readily understood. In use, an end portion of a harness tug or other strap 14 may be doubled as shown in Figures 1 and 2 and the doubled end portion of such strap may be inserted between the side members 3 of the body of the device against the toothed bottom 2 of the body of the device. The clamping member then is projected between the side members 3 of the body of the device with the attaching end portion 7 of the end member foremost and with the contact portions 9 and 8 of the clamping member in sliding contact with the inner faces of the inclined cam lips 4, the clamping member of course being inserted in the body of the device at the larger end of the body. The substantially flat faces of the clamping member indicated at 15 and 16 respectively in Figure 2 then will contact flatwise with the doubled end portion of the strap 14 when the clamping member has been pulled endwise of the body of the device. The doubled end portion of the strap 14 is then firmly clamped to the bottom 2 of the body of the device when the side member has been pulled longitudinally of the body of the device until such clamping member is firmly wedged between the cam lips 4 and the underlying end portion of the strap. Since the strap is contacted by substantially flat clamping faces, such strap will not be cut nor injured when it is clamped to the bottom of the device in the manner just described. Also, it is obvious that a strap or other flexible member that is to be held in place in the body of the device need not be doubled in order to be secured in place.

Obviously, my invention is susceptible of embodiment in forms other than that illustrated in the accompanying drawings, and I therefore consider as my own all such modifications and adaptations thereof as fairly fall within the scope of the appended claims.

I claim:—

1. A device of the character described comprising a body substantially U-shaped in cross sectional configuration and comprising a substantially flat bottom and a pair of parallel sides having inturned longitudinally extending free edge portions constituting lips, said sides of the body decreasing in width regularly from one end of the body to its opposite end so that said lips are inclined longitudinally of the body, a clamping member having a main portion of uniform width adapted to fit slidably in the body between the side members of the body and in sliding contact with the inner faces of said inclined lips, said clamping member also including an attaching end portion tapering in width toward its outer end, the main portion of said clamping member being bent transversely adjacent to its juncture with said attaching portion to produce a substantially U-shaped corrugation and being also bent at its free end until the free edge of said main portion of the clamping member is substantially flush with the crest of said U-shaped transverse portion of the clamping member, the faces of said main portion of the clamping member which are opposite to said transversely bent U-shaped portion and said end portion being substantially flush and constituting clamping faces, said attaching end portion of the clamping member being adapted for engagement with a chain.

2. A device of the character described comprising a body substantially U-shaped in cross sectional configuration and comprising a substantially flat bottom and a pair of parallel sides having inturned longitudinally extending free edge portions constituting lips, said sides of the body decreasing in width regularly from one end of the body to its opposite end so that said lips are inclined longitudinally of the body, a clamping member having a main portion of uniform width adapted to fit slidably in the body between the side members of the body and in sliding contact with the inner faces of said inclined lips, said clamping member also including an attaching end portion tapering in width toward its outer end, the main portion of said clamping member being bent transversely adjacent to its juncture with said attaching portion to produce a substantially U-shaped corrugation and being also bent at its free end until the free edge of said main portion of the clamping member is substantially flush with the crest of said U-shaped transverse portion of the clamping member, the faces of said main portion of the clamping member which are opposite to said transversely bent U-shaped portion and said end portion being substantially flush and constituting clamping faces, said attaching end portion of the clamping member having a lateral slit adjacent to its extremity, said lateral slit being turned outwardly and enlarged at its inner end to produce a seat for the partial reception of a link of a chain or like member, the part of the attaching portion at the outer side of said slit being bent flatwise to produce a hook.

CHRISTIAN HOFLAND.